July 26, 1960  C. F. ENGEL  2,946,251
SHEET METAL SHEAR HAVING DUAL TRACTIVE CUTTERS
Filed May 13, 1955  2 Sheets-Sheet 1

INVENTOR.
CHARLES F. ENGEL
BY
Jerome A. Gross,
ATTORNEY

July 26, 1960     C. F. ENGEL     2,946,251
SHEET METAL SHEAR HAVING DUAL TRACTIVE CUTTERS
Filed May 13, 1955     2 Sheets-Sheet 2

INVENTOR.
CHARLES F. ENGEL
BY
ATTORNEY

United States Patent Office 2,946,251
Patented July 26, 1960

2,946,251

SHEET METAL SHEAR HAVING DUAL TRACTIVE CUTTERS

Charles F. Engel, R.R. 3, Sparta, Ill.

Filed May 13, 1955, Ser. No. 508,108

1 Claim. (Cl. 83—488)

This invention relates to self-propelled sheet-metal shears and specifically to the type of shears shown in my co-pending application, Serial No. 389,624, filed November 2, 1953, which has matured into United States Patent No. 2,708,480, issued May 17, 1955.

The objects of the present invention are to bring about improvements to the type of shear disclosed in said co-pending application so as to produce perfect uniformity of cut on both sides of the line of shearing, to reduce the power required for operating the shear, to better adapt it for cutting a variety of thicknesses and tempers of metal, and to make possible infinitely narrow cuts. Further purposes are improved ease of assembly and servicing of the shear, and lessened need for fine adjustment.

The foregoing purposes together with others which will be apparent from the description which follows, are achieved by the principles hereafter set forth, and are embodied in the shear illustrated in the drawing, in which.

Figure 3:
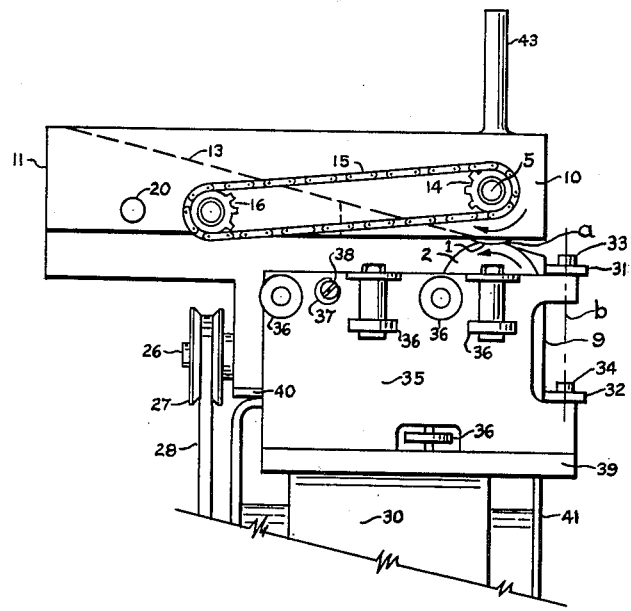
Figure 3 is an inner side elevation showing the shear frame assembly mounted upon its carriage.

The carriage described is adapted for mounting on a simple track along the edge of a work table or other level work-supporting surface, as shown in said co-pending application. The line of shearing is created by progression of the carriage along such track. The shear frame is mounted at such level that the point of shearing designated $a$ in Figure 3 will coincide with the level of the surface of such work table. Shearing results from progression of such point of shearing along and adjacent the edge of the work table, to form a line of cut. Terms of direction used herein refer to such line of cut; that is, "upper" or "upward" means above the level of the line of cut, and "lower" or "downward" means below the line of cut; "outward" means to that side of the line of cut away from the work table, and "inward" means to that side toward the work table; "forward" means the direction of movement of the shear during the cutting operation, and "aft" means the direction opposite to the direction of such movement.

Referring now to the drawings by the numbers of the detailed parts thereof, I provide a pair of shearing cutters consisting of an upper disc cutter 1 and a lower disc cutter 2, of equal diameter and having peripheral shearing edges 3 and 4, respectively. The disc cutters 1, 2 are maintained in overlapping shearing relationship with each other, so as to cut in a plane perpendicular to the plane of the work at a point of shearing designated $a$, being so positioned by their respective lateral supporting shafts 5 and 6. Adjacent the peripheral shearing edges 3, 4 are tractive peripheral cutter surfaces 7 and 8, respectively, which are knurled, coined or otherwise tooled to increase tractive friction exerted against the upper and lower surfaces respectively of a sheet of material to be sheared thereby.

The lateral supporting shaft 6 of the lower disc cutter 2 extends outward therefrom through, and is supported for rotation in, the forward end of a lower cutter-mounting frame portion 9, which may consist of a heavy, substantially vertical steel plate as shown. The lateral supporting shaft 5 of the upper disc cutter 1 extends inwardly from the cutter 1 through, and is supported for rotation in, the forward end of an upper cutter-mounting frame portion 10, which may be a similar heavy plate. Said lower and upper cutter-mounting frame portions 9, 10 are positioned outward and inward respectively of the point of shearing $a$; and are rigidly connected to each other by a bridge portion 11 which extends aft and upward from the lower cutter-mounting portion to a level above the level of the point of shearing $a$, thence inwardly, and thence forward to join the upper cutter-mounting frame portion 10. For ease and sturdiness of construction, the outer part of the bridge portion 11 immediately aft of the lower cutter-mounting portion 9 may be integral with it; likewise the inner part of the bridge portion 11 immediately aft of the upper cutter-mounting frame portion 10 may be integral with it. In such case, that part of the bridge portion extending across and above the line of cut may be a similar heavy steel plate welded between such integral aft portions above the level of the point of shearing $a$, and it is referred to as the bridge carry-over part 12.

As an alternative, the lower cutter-mounting frame portion 9, the upper cutter-mounting frame portion 10 and the entire bridge portion 11 including the bridge carry-over part 12 may be made integral, as by a single casting.

The lower cutter-mounting frame portion 9 and the outer part of the bridge portion 11 which lies immediately aft of such lower cutter-mounting portion 9, have a common upward-and-aft sloping scrap-deflector edge 13 outward of the point of shearing $a$. This is adapted to raise the portion of the sheet material outward of the line of cut formed by the progression of the point of shearing $a$, so that such portion of the material will ride over that part of the shear which extends outward of such line of cut.

The upper disc cutter 1 is secured to the outer end of its lateral supporting shaft 5. To the inner end thereof is secured an upper cutter-driving sprocket 14, driven by an inner chain 15 from an inner aft sprocket 16, which is rigidly mounted on the inner end of a lateral drive shaft 17 extending through and supported for rotation by the bridge portion 11. At the other side of the bridge portion 11, there is secured to the shaft 17 a driven spur gear 18, which engages a similar driving spur gear 19 mounted on a lateral stub shaft 20 aft of the drive shaft 17. Secured at the outer side of the driving gear 19 for rotation with it is an outer aft sprocket 21, connected by an outer chain 22 to a lower cutter shaft sprocket 23, which is secured to the cutter shaft 6 spacedly outward of the lower cutter-mounting frame portion 9. Within the space so provided on the shaft 6, there is secured on it a worm wheel 24, which is driven by a worm gear 25 affixed to a fore-and-act power shaft 26. To the aft end of the shaft 26 is affixed a sheave 27, driven by a belt 28 extending between it and a motor sheave 29, by which the power of an electric motor 30 is transmitted to the belt 28.

At the forward edge of the lower cutter-mounting frame portion 9 are heavy horizontal upper and lower pivot-receiving lugs 31, 32 by which the shear frame assembly heretofore described is mounted upon upper and lower aligned vertical pivots 33, 34 at the forward edge of a carriage plate 35, which pivots have an aligned common axis within the same plane (perpendicular to the plane of the work) as that in which the cutters 1, 2 make their cut. This plate 35 is normally parallel to and inward of the lower cutter-mounting frame portion 9, and somewhat beneath the upper cutter-mounting frame portion 10. The carriage plate 35 is supported by a plurality of carriage rolls 36 for forward-and-aft rolling along a track, not shown, mounted along, outward of, and beneath the level of a work table upon which sheet material is supported before and during the shearing operation.

The aligned vertical pivots 33, 34 have a common vertical axis designated $b$. As between the carriage plate 35 and the shear frame assembly mounted on the frame portion 9, a small degree of relative angular movement in a horizontal plane about this axis $b$ is permitted during the shearing operation, as described in said copending application. Such rotation may be restrained, as by a helical spring 37 mounted on the inner side of the carriage plate 35 under the head of an adjusting bolt 38 which passes through a cleared hole in the carriage plate 35 and is screwed into the lower frame portion 9. In Figures 7 and 8 of said co-pending application I showed two differing constructions for permitting limited pivoting between the frame and the carriage plate. The form shown in Figure 7 therein set the frame toed outward at a minute angle, against the resistance of the shear's inherent castering tendency described in said application, and the force of a single spring on the inner side of the carriage plate. Figure 8 of said co-pending application showed a modified embodiment incorporating springs on both sides of the carriage plate, with the alignment normally straight. This latter mechanism has proved to be better suited for the present construction, apparently because of the fact that the cutters herein used are equal in cutting effect and tractive force, and are symmetrical on both sides of the line of cut.

A lower alignment strip 39 welded to the inner side of the carriage plate 35 assists in maintaining it in position upon the carriage track, not shown.

Figure 1:
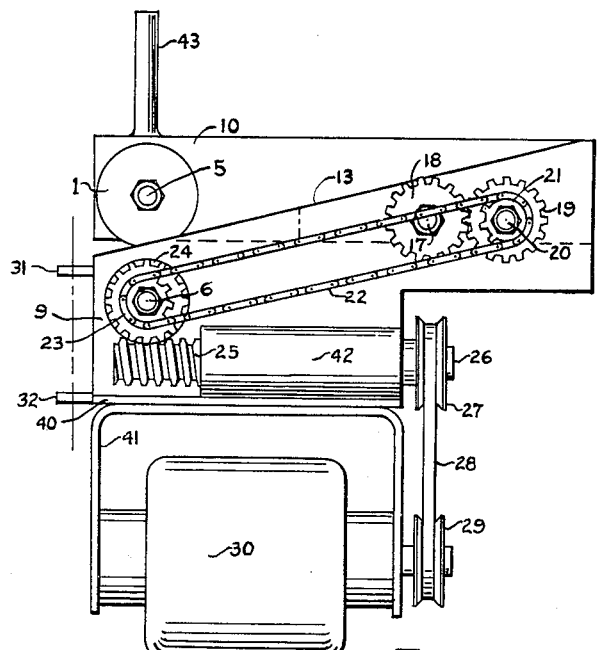
Figure 1 is an outer side elevation of the shear frame assembly.

Details of mounting the motor 30 and the fore-and-aft power shaft 26 may be varied. Shown in Figure 1 at the lower margin of the lower cutter-mounting frame 9 is welded an outward-extending horizontal mounting plate 40, beneath which is secured a motor-mount bracket 41, and above which is secured a tubular shield 42 which supports the power shaft 26. A handle 43 protrudes upward from the upper margin of the upper frame portion 10, and is used to position the shear so that its cutters 1, 2 commence engagement with the material to be sheared.

The various frame portions, and particularly the bridge portion 11, are utilized for supporting the simple power-transmission mechanism described, including the spur gears 18, 19, the sprockets 16, 21 and the chains 15, 22. This power-transmission support function is in addition to the cutter-positioning function of the frame assembly. In the power-transmission arrangement shown, when the electric motor 30 is started, power is transmitted from its sheave 29 through the belt 28 to the sheave 27 on the power shaft 26, and by its worm gear 25 through the worm wheel 24 to the lateral supporting shaft 6 of the lower disc cutter 2, causing it to rotate in the sense shown by the lower arrow in Figure 3. In this sense of rotation, a vector tangent at the point of shearing $a$ is opposite in direction to the direction of cutting. Such shaft rotation causes similar rotation of the lower cutter shaft sprocket 23, driving the outer chain 22 and the outer aft sprocket 21 and the driving spur gear 19 in the same sense. The sense of rotation is reversed by the engagement of the driving spur gear 19 with the driven spur gear 18, and the power is thus transmitted in the opposite sense through the lateral drive shaft 17, by means of the inner aft sprocket 16, inner chain 15 and upper cutter-driving sprocket 14 and lateral supporting shaft 5, to the upper disc cutter 1. Its sense of rotation is shown by the upper arrow in Figure 3; a vector tangent at the point of shearing $a$ will likewise be opposite to the direction of cutting. Inasmuch as the sprockets 14, 16, 21 and 23 are all the same size, the speed of rotation will not be changed; hence the upper disc cutter 1 and lower disc cutter 2 will rotate at the same speed though in opposite senses.

The friction of the knurled peripheral cutter surfaces 7, 8 upon the upper and lower surfaces respectively of a sheet of material introduced therebetween therefore draws the entire shear assembly firmly and progressively across the sheet of material, and shears it easily and uniformly. In contrast, in the embodiment shown in my copending application, the upper disc cutter merely idles, contributes no tractive force, and cuts by resisting advancement of the shear assembly.

The introduction of such dual tractive propulsion by and between both upper and lower disc cutters 1, 2 has materially reduced the power required for shearing, making it possible for the same cutter to shear sheets of increased thickness and hardness. The vertical alignment of the lateral supporting shafts 5, 6, as contrasted with the staggered alignment used in my previous cutter where the upper disc was not powered, and the symmetry of parts with reference to the line of cut, have minimized problems of alignment and adjustment, and lessened the need for precise tolerances. Another advantageous result is that after shearing, both sheared edges (that is, on both sides of the line of cut) will be found to be substantially identical, and free from warping and burrs. The portion of a cut sheet outward of the line of cut is not offal or scrap.

Figure 2:
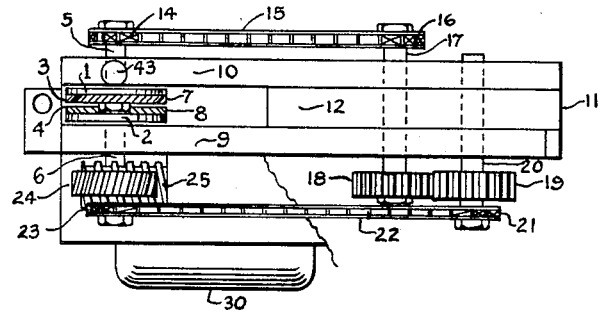
Figure 2 is a somewhat fragmentary plan view of the shear frame assembly shown in Figure 1.

In my said co-pending application, I describe the basic operating principle which has made possible a successful self-propelled shear, i.e., permitting the frame a degree of freedom to pivot casteringly with respect to the carriage. The present improvements make possible a fuller realization of the advantages of that principle. Symmetry of the cutters with respect to the line of cut is provided by having the adjacent sides of the cutters 7, 8 presented parallel to each other along a line which substantially intersects the pivot, as shown in Figure 2. This feature, together with the equal tractive engagement of the cutters on both sides of the sheet being sheared, add sureness, reliability and efficiency to the shear. For the first time, extremely fine strips or slivers of material may be cut, with even, uniformly smooth edges.

Various modifications of the inventive principles herein disclosed will occur to those familiar with the art of shearing tools. The present invention is not to be construed narrowly, but as fully coextensive with the invention herein disclosed as defined and limited by the claim which follows.

I claim:

A self-propelled shear for planar material comprising a horizontal planar work surface, a rectilinear track mounted outward of the work surface parallel to its edge, a carriage having means supporting it on said track and having pivot means perpendicular to the plane of the work surface, in combination with a shear frame borne by the carriage and pivotally connected to it by the pivot means, the shear frame having an outer lower rotary cutter and an inner upper rotary cutter, and lateral shafts presenting said cutters in overlapping engagement at the level of said work surface plane in a vertical cutting plane established by the pivot as the carriage moves said tracks, the shear frame further having an outer cutter-mounting portion whose forward end supports the shaft of the outer cutter and lies below the said work surface plane and outward of the cutting plane, said outer cutter-mounting portion having an upper surface sloping upward and aft to project above said work surface plane, the shear frame further having an inner cutter-mounting portion above the work surface plane whose forward end supports the shaft of the upper cutter, the shear frame further having a bridge portion above the work surface plane joining the aft end of the inner cutter-mounting portion to the upward-and-aft projection of the outer cutter-mounting portion, together with a power source mounted below the work surface plane and outward of the cutting plane, and power transmission means to drive said cutters in opposite directions of rotation at the same peripheral speed, said means including a forward rotary member secured on said outer cutter shaft outward of the outer cutter-mounting portion and below the work surface plane, a forward rotary member on the inner cutter shaft inward of the inner cutter-mounting member of the inner cutter-mounting portion and above the work surface plane, outer and inner aft rotary members operatively connected to said outer and inner forward rotary members respectively, the said aft rotary members being shaft-supported on said frame above the work surface plane but below the upper surface of the outer cutter-mounting portion.

References Cited in the file of this patent

UNITED STATES PATENTS

| | | |
|---|---|---|
| 1,024,409 | Luther | Apr. 23, 1912 |
| 1,098,671 | Lundy | June 2, 1914 |
| 1,241,313 | Wagner | Sept. 25, 1917 |
| 1,744,224 | Hirsch | Jan. 21, 1930 |
| 1,913,951 | Possnett | June 13, 1933 |
| 2,060,600 | Weiss | Nov. 10, 1936 |
| 2,216,108 | Brockway | Oct. 1, 1940 |
| 2,439,794 | Bugatti | Apr. 20, 1948 |
| 2,708,480 | Engel | May 17, 1955 |
| 2,772,734 | Judelson | Dec. 4, 1956 |

FOREIGN PATENTS

| | | |
|---|---|---|
| 26,194 | Great Britain | Nov. 15, 1913 |
| 270,732 | Great Britain | Sept. 15, 1927 |